(12) United States Patent
Argenio

(10) Patent No.: US 7,597,754 B2
(45) Date of Patent: Oct. 6, 2009

(54) ASPHALTIC COMPOSITIONS AND METHODS OF THEIR MANUFACTURE

(75) Inventor: Andrew L. Argenio, 18 Church St., Cornwall-on-the-Hudson, NY (US) 12520

(73) Assignee: Andrew L. Argenio, Cornwall on Hudson, NY (US)

( * ) Notice: Subject to any disclaimer, the term of this patent is extended or adjusted under 35 U.S.C. 154(b) by 352 days.

(21) Appl. No.: 11/471,570

(22) Filed: Jun. 21, 2006

(65) Prior Publication Data

US 2007/0054989 A1  Mar. 8, 2007

(51) Int. Cl.
*C08L 95/00* (2006.01)
(52) U.S. Cl. ............. 106/281.1; 106/273.1; 106/277; 524/59
(58) Field of Classification Search ............ 106/277, 106/281.1, 273.1; 524/59
See application file for complete search history.

(56) References Cited

U.S. PATENT DOCUMENTS

| 4,540,287 | A | * | 9/1985 | Servas et al. ............ 366/7 |
| 5,173,115 | A | * | 12/1992 | Glynn, Jr. et al. ........ 106/281.1 |
| 5,217,530 | A | * | 6/1993 | Grzybowski ........... 106/163.01 |
| 5,242,493 | A | * | 9/1993 | Glynn et al. ............. 106/277 |
| 5,344,485 | A | * | 9/1994 | Glynn, Jr. ............... 106/281.1 |
| 5,397,389 | A | * | 3/1995 | Glynn, Jr. ............... 106/281.1 |
| 5,405,440 | A | * | 4/1995 | Green et al. ............ 106/281.1 |
| 6,206,607 | B1 | * | 3/2001 | Medico et al. ............ 404/2 |
| 6,231,663 | B1 | * | 5/2001 | Catterton et al. .......... 106/705 |
| 6,706,108 | B2 | * | 3/2004 | Polston ................. 106/281.1 |
| 6,752,273 | B2 | * | 6/2004 | Reddoch ................. 209/2 |
| 7,264,667 | B2 | * | 9/2007 | Bouldin ................. 106/281.1 |
| 7,371,277 | B2 | * | 5/2008 | Polston ................. 106/697 |

* cited by examiner

*Primary Examiner*—Helene Klemanski
(74) *Attorney, Agent, or Firm*—Mayer Brown

(57) ABSTRACT

Asphaltic compositions that are made from recycled waste building materials may include recycled plastics, provide reduced environmental impact and may be formed to meet state standards for aggregates used in asphaltic cement and other paving and construction standards.

13 Claims, No Drawings

ASPHALTIC COMPOSITIONS AND METHODS OF THEIR MANUFACTURE

FIELD OF INVENTION

This invention relates to asphaltic compositions, such as asphaltic concretes, blacktops, pavements and the like, and asphaltic compositions made from recycled materials. More particularly, this invention relates to asphaltic materials, pavements made there from, and to methods for making paving materials and pavements having recycled or waste building materials as a component of the asphaltic composition.

BACKGROUND OF THE INVENTION

Paving materials such as asphaltic concretes that are used for roadways, parking areas, walkways and other traffic surfaces have been the subjects of much recent research. Some of these efforts have involved the addition of polymers, including plastics, in attempts to improve the flexibility, strength and life of the paving material. Other efforts have centered on recycling roadway asphalts in an effort to lower costs and reduce the environmental impacts such roadways have on our surroundings.

The increasing need to dispose of or find new uses for used or waste building materials (such as concrete, brick, gravel, rock and other debris) has led to growing costs and increased environmental concerns in the disposal of these materials.

DETAILED DESCRIPTION

The present invention provides for asphaltic compositions, such as an asphaltic concrete, blacktop, pavement or other similar composition. Such compositions include an aggregate and a binder to hold the aggregate in place upon curing of the composition to form, e.g., a roadway.

Aggregates

The aggregates of the present invention may be made from one or more recycled materials (referred to herein as "recycled aggregates"). For example, the recycled materials may be obtained from recovered waste, scrap or debris building materials obtained from demolition, remodeling or building sites. These recycled materials may include a wide variety of granulated, crushed or pulverized materials. For example, such materials may include the following: concrete, rock, stone, stone aggregates, sand, brick or material derived from masonry units. Mixtures of one or more of these materials may also be used to form the recycled aggregate of the present invention. For example, the recycled aggregate may be a mixture of rock, brick and concrete. In an embodiment of the present disclosure, and without limiting the scope of the disclosure herein, an asphaltic composition may include at least 5% by weight of recycled aggregate. In additional embodiments, the recycled aggregate may include at least 1% by weight of recycled brick. In yet another embodiment, an asphaltic composition of the present disclosure may include at least 15% by weight of recycled aggregate.

The recycled aggregates of the present invention may further include other aggregate materials, traditionally used to form aggregates for asphaltic compositions, in conjunction with the above mentioned recycled materials. Such traditional materials include virgin rock, stone or concrete, crushed gravel or crushed slag and may also include asphaltic materials or bitumen.

Other recycled materials may also be included in the recycled aggregates of the present invention. For example, roofing material such as shingles, plastics or recycled asphalt or asphalt waste and the like.

To maintain the desired properties of the asphaltic cement, the size distribution of the recycled aggregate may be controlled. In this manner, the recycled aggregate may be produced so as to conform to, e.g., a particular state highway standard for aggregates used in asphaltic cements. Generally, this process of creating a recycled aggregate with a controlled particle size distribution may be accomplished as follows, although other suitable processes for preparing aggregates for asphaltic materials may be employed.

For example, larger recycled materials are first broken up, crushed, pulverized or otherwise mechanically granulated to form a particulate. The resulting particulate is then passed through several screens so that as a result, individual particles are separated by size in particle fractions. From the sorted materials, a recycled aggregate can then be produced by mixing the desired portion of each sized particle fractions. For example, an aggregate may include from five to seven sieve sizes ranging from no. 40 to three-fourths inch in size, or preferably from no. 200 to one inch in size.

For example, using the above technique a given recycled aggregate may be formed in accordance with a particular state highway standard for asphaltic compositions. One such suitable mix is, for example, shown in Table 1, and represents formulation parameters for bituminous plant mixtures according to the standards of New York State.

TABLE 1

New York State Standard of Bituminous Plant Mixtures

| | Mixture | | | | | | | | | | | |
| --- | --- | --- | --- | --- | --- | --- | --- | --- | --- | --- | --- | --- |
| | Base | | | | Binder | | Shim Requirements[1] | | Top[2] | | | |
| | Type 1 | | Type 2 | | Type 3 | | Type 5 | | Type 6, 6F | | Type 7, 7F | |
| Screen Sizes | General Limits % Passing | Job Mix Tol. % | General Limits % Passing | Job Mix Tol. % | General Limits % Passing | Job Mix Tol. % | General Limits % Passing | Job Mix Tol. % | General Limits % Passing | Job Mix Tol. % | General Limits % Passing | Job Mix Tol. % |
| 50.0 mm | 100 | — | 100 | — | — | — | — | — | — | — | — | — |
| 37.5 mm | 90-100 | — | 75-100 | ±7 | 100 | — | — | — | — | — | — | — |
| 25.0 mm | 78-95 | ±5 | 55-80 | ±8 | 95-100 | — | — | — | 100 | — | — | — |
| 12.5 mm | 57-84 | ±6 | 23-42 | ±7 | 70-90 | ±6 | — | — | 95-100 | — | — | — |
| 6.3 mm | 40-72 | ±7 | 5-20 | ±6 | 48-74 | ±7 | 100 | — | 65-85 | ±7 | — | — |
| 3.2 mm | 26-57 | ±7 | 2-15 | ±4 | 32-62 | ±7 | 80-100 | ±6 | 36-65 | ±7 | — | ±6 |

TABLE 1-continued

New York State Standard of Bituminous Plant Mixtures

| | Mixture | | | | | | | | | | | |
|---|---|---|---|---|---|---|---|---|---|---|---|---|
| | Base | | | | Binder | | Shim | | Top[2] | | | |
| | Requirements[1] | | | | | | | | | | | |
| | Type 1 | | Type 2 | | Type 3 | | Type 5 | | Type 6, 6F | | Type 7, 7F | |
| Screen Sizes | General Limits % Passing | Job Mix Tol. % | General Limits % Passing | Job Mix Tol. % | General Limits % Passing | Job Mix Tol. % | General Limits % Passing | Job Mix Tol. % | General Limits % Passing | Job Mix Tol. % | General Limits % Passing | Job Mix Tol. % |
| 850 μm | 12-36 | ±7 | — | — | 15-39 | ±7 | 32-72 | ±7 | 15-39 | ±7 | | ±7 |
| 425 μm | 8-25 | ±7 | — | — | 8-27 | ±7 | 18-52 | ±7 | 8-27 | ±7 | | ±7 |
| 180 μm | 4-16 | ±4 | — | — | 4-16 | ±4 | 7-26 | ±4 | 4-16 | ±4 | | ±4 |
| 75 μm | 2-8 | ±2 | — | — | 2-8 | ±2 | 2-12 | ±2 | 2-6 | ±2 | | ±2 |
| Asphalt Content, %[3,4] | 4.0-6.0 | ±0.4 | 5.2-4.5 | ±0.4 | 4.5-6.5 | ±0.4 | 7.0-9.5 | ±0.4 | 5.8-7.0 | ±0.4 | 6.0-8.0 | ±0.4 |
| Description and Typical Uses | Dense base course with relatively low permeability | | Open base course with relatively high permeability | | Dense intermediate course with relatively low permeability | | Dense, smooth texture sand asphalt for leveling where feathered edge is required | | Dense, granular texture for rural suburban, and urban arterial roadways | | Dense, gritty texture for single course resurfacing of rural, suburban, and urban arterial | |

Notes:
[1]All aggregate percentages are based on the total weight of the aggregate. The asphalt content is based on the total weight of the mix.
[2]The "F" designation in the mix type indicates that high friction coarse aggregates are required.
[3]When slag aggregates are used in the mix, the asphalt content shall be increased accordingly minimum 25 percent for all slag mix.
[4]The asphalt content job mix tolerance of ±0.4% shall not apply to Marshall Design mixtures.

By way of another example, the size distribution of the recycled aggregate may be prepared in accordance to the Texas Master Gradation Bands as shown in Table 2.

TABLE 2

Texas Master Gradation Bands (% Passing by Weight or Volume) and Volumetric Properties of Aggregates Used in Hot-Mix, Cold-Laid Asphaltic Concretes.

| Sieve Size | A Coarse Base | B Fine Base | C Coarse Surface | D Fine Surface | F Fine Mixture |
|---|---|---|---|---|---|
| 1½" | 98.0-100.0 | — | — | — | — |
| 1" | 78.0-94.0 | 98.0-100.0 | — | — | — |
| ¾" | 64.0-85.0 | 84.0-98.0 | 95.0-100.0 | — | — |
| ½" | 50.0-70.0 | — | — | 98.0 | — |
| ⅜" | — | 60.0-80.0 | 70.0-85.0 | 85.0-100.0 | 98.0-100.0 |
| #4 | 30.0-50.0 | 40.0-60.0 | 43.0-63.0 | 50.0-70.0 | 80.0-86.0 |
| #8 | 22.0-36.0 | 29.0-43.0 | 32.0-44.0 | 35.0-46.0 | 38.0-48.0 |
| #30 | 8.0-23.0 | 13.0-28.0 | 14.0-28.0 | 15.0-29.0 | 12.0-27.0 |
| #50 | 3.0-19.0 | 6.0-20.0 | 7.0-21.0 | 7.0-20.0 | 6.0-19.0 |
| #200 | 2.0-7.0 | 2.0-7.0 | 2.0-7.0 | 2.0-7.0 | 2.0-7.0 |
| | Design VMA[1], % Minimum | | | | |
| — | 12.0 | 13.0 | 14.0 | 15.0 | 16.0 |
| | Plant-Produced VMA[1], % Minimum | | | | |
| — | 11.0 | 12.0 | 13.0 | 14.0 | 15.0 |

Note:
[1]Voids in mineral aggregates.

Binder

To form an asphaltic composition, such as an asphaltic concrete, blacktop, pavement or other similar such material, the recycled aggregate of the present invention may be combined with a suitable binder. Many such binders will be known to one of skill in the art. For example, such binders may include tars. Binders in accordance with the present invention may also take the form of asphalt emulsions such as asphalt/water or asphalt/naphthalene binders, such as, for example, the binders referred to as MS2 and HMFS-64.

The binders may also be polymeric materials. In one embodiment the polymeric materials may be obtained or recycled from at least one of various waste sources. Any waste source is suitable. Examples of such sources are municipal solid waste, industrial waste and household waste. Any single or combination of multiple polymeric materials may be used such as thermosets, elastomers, and thermoplastics. Non-limiting examples of such materials are: acetals, acrylics, amino resins, cellulosics, phenolics, polyamides, polyesters, polyolefins, polyethers, styrenes, vinyls, polyurethanes, ketone-formaldehydes, polycarbonates, epoxy resins, polyethylene terphtalates, polyethylenes (including high and low density), polypropylenes, polyvinyl chlorides, polystyrenes, melamine-fomaldehyde resins, urea-fomaldehyde resins, acyrlonitrile butadiene styrene copolymers, blends, mixtures, and other copolymers (including terpolymers, etc.). Preferred examples of such materials include polyethylene terphthalate, high density polyethylene, styrene (including styrene-butadiene rubber, styrene-butadiene-styrene block copolymer) and polystyrene. Non-limiting common examples of recyclable items comprising such materials may include tools, gears, bearings, pumps, valves, screws, containers, bottles, fans, paint sprayers, shower heads, tool handles, dishes, molded products, switch cover plates, buttons, electric mixer housings, cabinets, coffee makers, door knobs, adhesives, laminates, coatings, fabric, shoe heels, eyeglass frames, toothbrush handles, pen and pencil barrels, piano keys, beads, toys, fishing tackle, cutlery handles, combs, steering wheels, veneers, automotive parts, pulleys, washing machines, detergent dispensers, telephones, food containers, ashtrays, croquet balls, roof panels, windshield wipers, football helmets, inks, clothing, cellophane, boat hulls, vehicle bodies, wash tubs, luggage, costume jewelry, fan blades, pie fittings, surgical implants, insulation, drink containers, trash can liners, bags, rug backing, canteens, gaskets, tires, sponges, furniture, and utensils, and the like. Preferably these items may be recyclable drink bottles, such as water bottles or soda bottles, for example polyethylene terephthalate containers.

The binders of the current invention may be used alone or in combination. For example the binders may be combinations of polymeric materials, or combinations of tars and polymeric materials, or combinations of asphalt emulsions and polymeric materials, or combinations of tars and asphalt emulsions, or combinations of tars, asphalt emulsions, and polymeric materials, or any other combination of binders. Furthermore, the binders of the present disclosure may include virgin binders (i.e. binders not made from waste sources or recycled materials), recycled binders, or any combination thereof. In an embodiment of the present disclosure, and without limiting the scope of the disclosure herein, an asphaltic composition may include 80% by weight of binder. In an additional embodiment, an asphaltic composition may include 85% by weight of binder.

One method of forming the asphaltic composition of the present invention includes the steps of mixing the recycled aggregate with the binding agent. The recycled aggregate may be heated to an elevated temperature prior to mixing with the binder. For example, the recycled aggregate may be heated to greater than 100° F., for example, to greater than 120° F., for instance, to greater than 130° F., such as greater than 150° F. The recycled aggregate may be heated to less than 400° F., for example, to less than 350° F., such as less than 300° F. or less than 250° F., such as less than 230° F.

The heated recycled aggregate may then be mixed with a binder. The binder may also be an elevated temperature. For example, the binder may be heated to a temperature greater than 100° F., for example, to greater than 120° F., for instance, to greater than 130° F., such as greater than 150° F. It is also possible for both the binder and the recycled aggregate to be at the same temperature when they are mixed.

Heater

As described above, the recycled aggregate of the present invention may be heated to an elevated temperature prior to mixing with the binder. For example, the aggregates of the present invention, including the recycled aggregates, may be heated with a radiant heater, subjected to microwave irradiation to heat it, or a combination of radiant heating and heating through microwave irradiation may be used. Preferably a radiant heater is used.

What is claimed is:

1. A hot-mix asphaltic composition comprising:
  a. at least 5% of a recycled aggregate; and
  b. a binder;
  wherein said recycled aggregate comprises at least 1% recycled brick and said binder comprises recycled polymeric waste, and wherein all percentages are on a weight to weight basis of the asphaltic composition.

2. A pavement made from the asphaltic composition of claim 1.

3. The asphaltic composition of claim 1 wherein said binder further comprises standard asphalt binder.

4. The asphaltic composition of claim 3 further comprising a polymeric additive.

5. A polymer modified hot-mix asphalt cement comprising:
  a. at least 5% recycled aggregate;
  b. a binder; and
  c. a polymeric additive;
  wherein said recycled aggregate comprises at least 1% recycled brick and said binder comprises recycled polymeric waste, and wherein all percentages are on a weight to weight basis of the asphaltic composition.

6. The polymer modified asphalt of claim 5 wherein said recycled polymeric waste is a styrene-butadiene rubber.

7. The polymer modified asphalt of claim 5 wherein said recycled polymeric waste is styrene-butadiene-styrene block copolymer.

8. The polymer modified asphalt of claim 5 wherein said recycled polymeric waste is tire rubber.

9. A method of forming a blacktop composition comprising:
  a. heating an aggregate composition with a radiant heater to form a hot aggregate; and
  b. mixing said hot aggregate with a binder composition wherein said binder composition comprises recycled polymeric waste.

10. The method of claim 9 wherein said hot aggregate is at least 120° F.

11. The method of claim 9 wherein said hot aggregate is at least 150° F.

12. The method of claim 9 wherein said hot aggregate is between 100° F. and 230° F.

13. The method of claim 12 wherein said hot aggregate is between 150° F. and 200° F.

* * * * *